(12) United States Patent
Lauer et al.

(10) Patent No.: US 9,239,074 B2
(45) Date of Patent: Jan. 19, 2016

(54) SEAL, SCREW CONNECTION HAVING THE SEAL, AND USE THEREOF

(71) Applicants: Frank Lauer, Rauenberg (DE); Julia Eckstein, Mannheim (DE); Christian Mitschkal, Wald-Michelbach (DE); Thomas Kramer, Rimbach (DE)

(72) Inventors: Frank Lauer, Rauenberg (DE); Julia Eckstein, Mannheim (DE); Christian Mitschkal, Wald-Michelbach (DE); Thomas Kramer, Rimbach (DE)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 14/363,312

(22) PCT Filed: Nov. 7, 2012

(86) PCT No.: PCT/EP2012/004634
§ 371 (c)(1),
(2) Date: Jun. 6, 2014

(87) PCT Pub. No.: WO2013/087134
PCT Pub. Date: Jun. 20, 2013

(65) Prior Publication Data
US 2015/0023764 A1 Jan. 22, 2015

(30) Foreign Application Priority Data
Dec. 12, 2011 (DE) .......................... 10 2011 120 724

(51) Int. Cl.
*F16B 43/02* (2006.01)
*F16B 43/00* (2006.01)
*F16J 15/12* (2006.01)

(52) U.S. Cl.
CPC ............. *F16B 43/001* (2013.01); *F16J 15/127* (2013.01)

(58) Field of Classification Search
CPC .............................. F16J 15/127; F16B 43/001
USPC ........................................................ 411/542
See application file for complete search history.

(56) References Cited

U.S. PATENT DOCUMENTS

| | | | | | |
|---|---|---|---|---|---|
| 3,009,722 | A | * | 11/1961 | Augustin | 411/542 |
| 3,167,322 | A | * | 1/1965 | Aichroth | 277/453 |
| 4,570,440 | A | * | 2/1986 | Doran | 60/322 |
| 4,702,657 | A | | 10/1987 | Jelinek | |
| 5,364,109 | A | * | 11/1994 | Sihon | 277/592 |

(Continued)

FOREIGN PATENT DOCUMENTS

| | | |
|---|---|---|
| CN | 1846070 A | 10/2006 |
| DE | 19508977 A1 | 7/1996 |

(Continued)

*Primary Examiner* — Gary Estremsky
(74) *Attorney, Agent, or Firm* — Leydig, Voit & Mayer, Ltd.

(57) ABSTRACT

A seal of a fastening element, having the fastening element and a washer, wherein the fastening element and the washer are arranged coaxially and axially adjacent to one another, wherein the washer has a sealing bead of a rubber-elastic sealing material on the outer circumference, and wherein the sealing bead contacts the fastening element underside in a sealing manner during the correct use of the seal. The fastening element has a flange on the underside, which axially faces the washer, wherein the a washer top side axially faces the flange, wherein the flange underside and the washer top side abut in a sealing manner during the correct use of the seal, wherein the flange underside and the washer top side are substantially congruent, and wherein the sealing bead abuts the outer circumferential boundary of the flange underside in a sealing manner.

7 Claims, 3 Drawing Sheets

(56) References Cited

U.S. PATENT DOCUMENTS

| | | | |
|---|---|---|---|
| 5,413,359 A * | 5/1995 | Latty | 277/650 |
| 5,456,505 A * | 10/1995 | Yamada | 292/202 |
| 5,518,257 A * | 5/1996 | Breaker | 277/612 |
| 5,836,427 A * | 11/1998 | Nakajima et al. | 188/73.46 |
| 6,173,969 B1 * | 1/2001 | Stoll et al. | 277/630 |
| 6,347,708 B1 * | 2/2002 | Ostergaard | 209/326 |
| 2008/0310932 A1 * | 12/2008 | McIntyre et al. | 411/150 |
| 2010/0251661 A1 * | 10/2010 | Illgner et al. | 52/698 |
| 2010/0290857 A1 | 11/2010 | Smolarek et al. | |
| 2011/0194913 A1 * | 8/2011 | Lewis et al. | 411/432 |

FOREIGN PATENT DOCUMENTS

| | | |
|---|---|---|
| EP | 0795691 A1 | 9/1997 |
| JP | 2007024280 A | 2/2007 |
| WO | WO 0165128 A1 | 9/2001 |
| WO | WO 2006068517 A2 | 6/2006 |

* cited by examiner

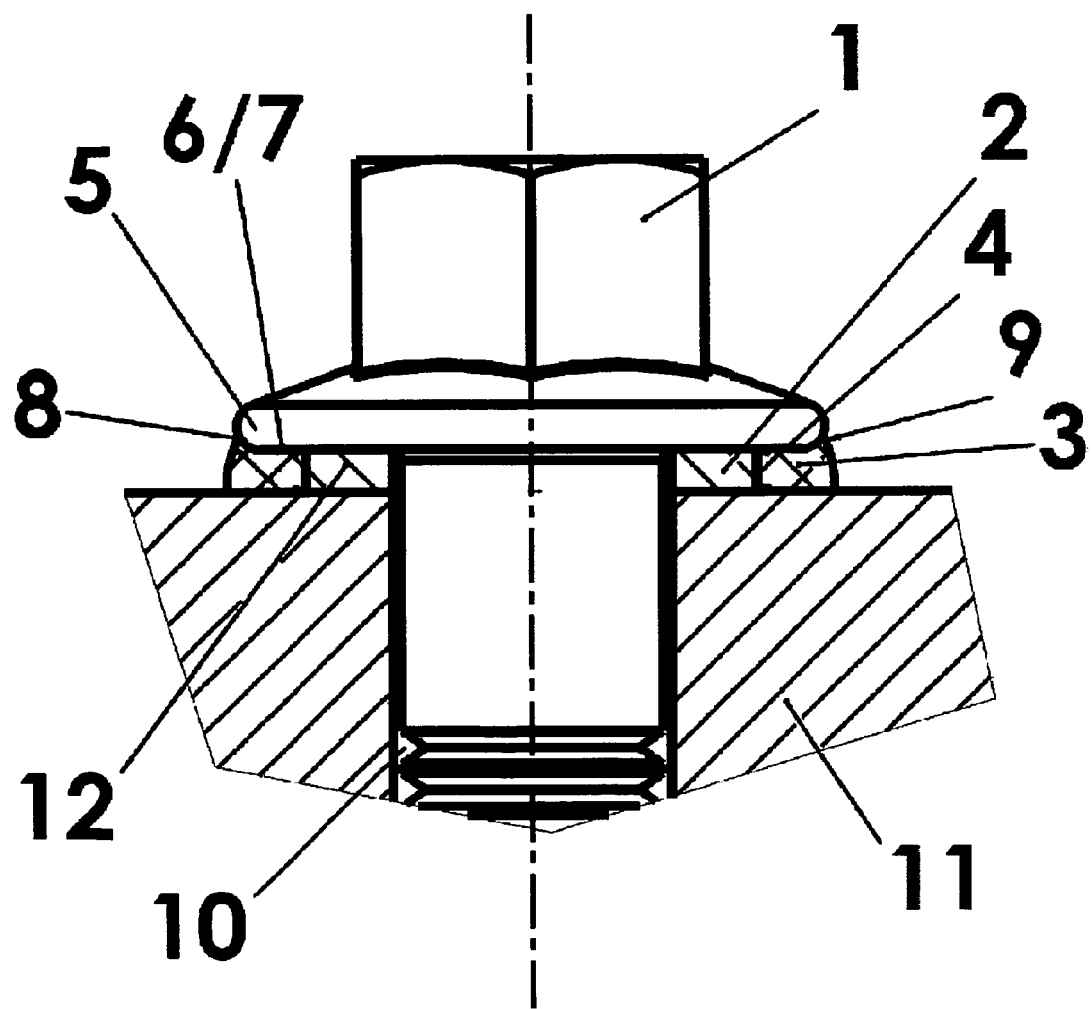

SEAL, SCREW CONNECTION HAVING THE SEAL, AND USE THEREOF

CROSS-REFERENCE TO RELATED APPLICATIONS

This application is a U.S. National Phase Application under 35 U.S.C. §371 of International Application No. PCT/EP2012/004634 filed on Nov. 7, 2012, and claims benefit to German Patent Application No. DE 10 2011 120 724.8 filed on Dec. 12, 2011. The International Application was published in German on Jun. 20, 2013, as WO 2013/087134 A1 under PCT Article 21(2).

FIELD

The invention relates to a seal of a fastening element, comprising the fastening element and a washer therefor.

BACKGROUND

Seals of this type are generally known. In this case the fastening element is formed for example by a screw and the washer is formed by a so-called Usit ring. Usit rings are flat metallic rings having trapezoidal sealing beads, which are used for sealing screw connections and flanged joints. Usit rings are therefore self-sealing washers.

Two different types of Usit rings are known. In one type, the sealing bead is on the inside, whereas in the other type, it is on the outside.

When the fastening element is tightened, the flexible rubber sealing bead is elastically deformed until a metallic force locking effect is achieved via the flat ring.

Different material pairings are known for the flat ring of the Usit ring and for the sealing bead. Thus, for example, the flat ring can consist of a normal steel and the sealing bead can consist of an NBR or FKM material, subject to the temperatures which prevail. NBR materials are used for example when air and mineral oils are to be sealed at a temperature of up to 100° C. On the other hand, FKM materials are used for sealing air and mineral oils or synthetic oils at higher temperatures in each case. The previously known seals are not suitable for use in areas in contact with products in the food or pharmaceutical industries, nor are they suitable for use in plants in the food or pharmaceutical sectors because the previously known seals have many gaps and projections which are difficult to access and therefore also difficult to clean. Impurities in these regions can lead to contamination, which is unacceptable or not permissible in the food or pharmaceutical sectors.

SUMMARY

An aspect of the invention provides a seal of a fastening element, the seal comprising: the fastening element; and a washer configured to fit the fastening element, wherein the fastening element and the washer are arranged coaxially and axially adjacent to one another, wherein the washer includes a sealing bead including a flexible rubber sealing material on an outer circumference, wherein the sealing bead is configured to contact a fastening element underside in a sealing manner during correct use of the seal, wherein the fastening element includes a flange on a flange underside, the flange underside axially facing the washer, wherein the washer includes a washer top side axially facing the flange, wherein the flange underside and the washer top side rest on one another in a sealing manner during the correct use of the seal, wherein the flange underside and the washer top side are substantially congruent, and wherein the sealing bead rests on an outer circumferential boundary of the flange underside in a sealing manner.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 3 shows the screw connection of FIG. 1 in the installed state during the correct use thereof.

DETAILED DESCRIPTION

Figure 1:
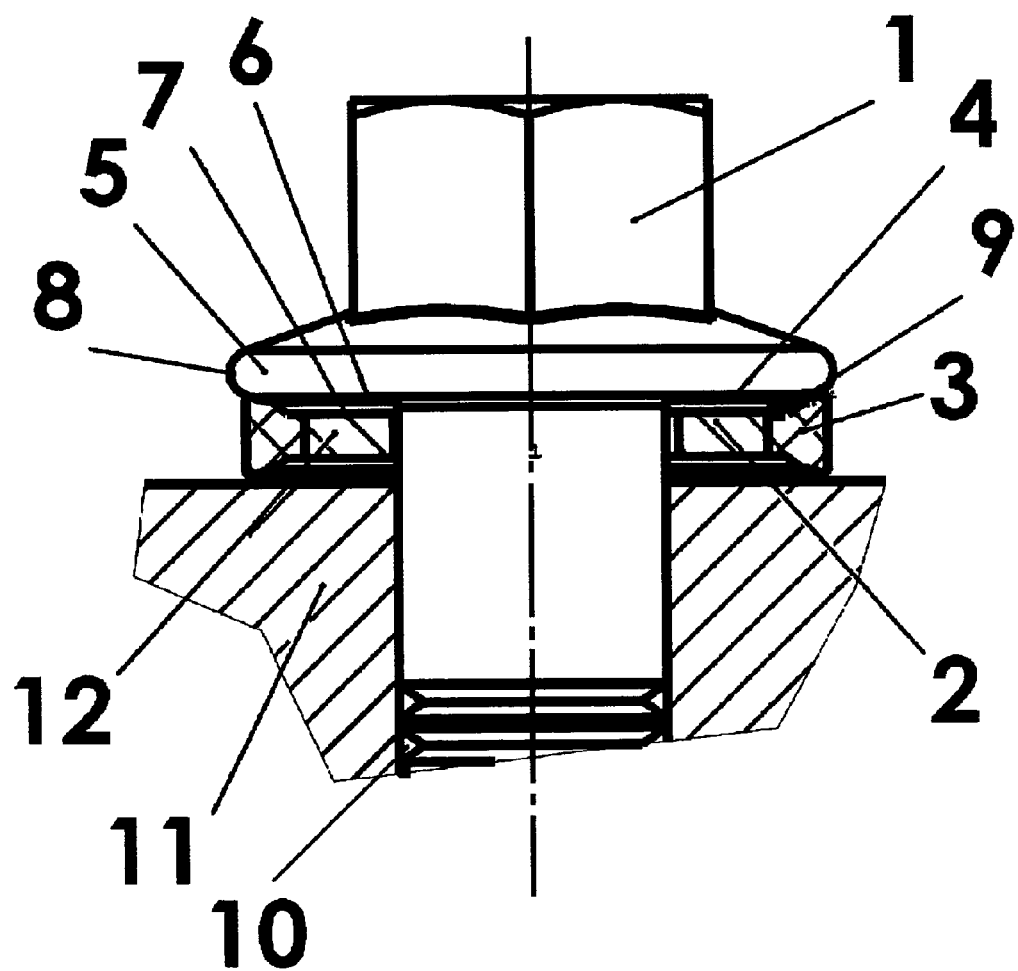
FIG. 1 shows a screw connection with the seal not yet having been installed.

An aspect of the invention provides a seal of a fastening element, comprising the fastening element and a washer therefor, the fastening element and the washer being arranged coaxially and axially adjacent to one another, the washer having a sealing bead made of a flexible rubber sealing material on the outer circumference and the sealing bead coming into contact with the underside of the fastening element in a sealing manner during the correct use of the seal.

An aspect of the invention provides a seal of a fastening element of the type mentioned at the outset, such that the seal can also be used in the food or pharmaceutical sectors and satisfies all the hygiene requirements prescribed in these sectors. In particular, any contamination of the seal should be ruled out since the seal can be cleaned easily and effectively.

An aspect of the invention provides a fastening element has a flange on the side axially facing the washer, with an underside axially facing the washer, the washer having a top side axially facing the flange, the underside of the flange and the top side of the washer resting on one another in a sealing manner during correct use of the seal, the underside of the flange and the top side of the washer being substantially congruent and the sealing bead resting on the outer circumferential boundary of the underside of the flange in a sealing manner.

A configuration of this type makes it possible for impurities around the seal to be cleaned using the CIP (Clean In Place) method. Therefore, for the thorough, perfectly hygienic cleaning of the seal, it is unnecessary to dismantle the components which are fastened together. The simple possibility of thorough, perfectly hygienic cleaning effectively prevents any contamination of the seal. In the seal according to the invention, there are no narrow, uncleanable gaps or projections behind which impurities could accumulate, so that the seal according to the invention complies with all the hygiene regulations for the food and pharmaceutical sectors. The perfect hygiene of the seal is mainly attributed to the fact that the fastening element and the washer are substantially congruent on their sides facing one another axially. The disadvantage of the prior art that for example the head of a hexagon screw is supported on an annular Usit ring by an annular sealing bead which has a substantially smaller external diameter than the head of the screw, and that consequently regions of the seal are produced, which are practically uncleanable or which cannot be cleaned satisfactorily, is avoided thereby.

The fastening element can be configured as a screw or as a nut. If a nut is used, then the nut has to be configured as a cap nut with regard to the simplest and most effective cleaning possible of the seal.

The fastening element and the flange are preferably formed such that they merge integrally into one another. This measure also prevents the formation of gaps which are not easy to clean and in which any medium to be sealed or impurities could collect. Fastening elements having a flange are disclosed in DIN EN 1665. These are hexagon screws, the hexagonal screw head being configured, on the side axially facing the thread, with a circular flange which merges integrally into the screw head. Since it is possible to use standardised fastening elements for the seal according to the invention, the seal can be produced simply and economically and can be easily adapted to the respective conditions for example by means of hexagon screws of different dimensions according to DIN EN 1665.

An advantageous configuration can provide that the sealing bead has, on its side axially facing the underside of the flange, a substantially funnel-shaped surface. The surface can be widened radially outwards at least in two stages. This multi-stage contour of the surface produces in the first stage an initial sealing force, i.e. the pre-tensioning force for the screw connection, and in the second stage the gap-free tight fitting of the flexible rubber sealing material of the sealing bead against the underside of the flange.

The surface of the top side of the washer is configured congruently relative to the underside of the flange of the fastening element.

The surface of the top side can be self-centering.

Here, it is advantageous that the washer with the sealing bead fits tightly in a flush manner against the underside of the flange, irrespective of the tolerance position thereof. The assembly of the seal is substantially simplified by this self-centering of the washer. The risk of assembly errors is reduced to a minimum.

The invention also relates to a screw connection comprising a seal with fastening element and washer, as previously described, the fastening element being arranged positively and/or non-positively in a hole in a machine element, the sealing bead being arranged, with resilient axial pre-tension, in a sealing manner between the underside of the flange of the fastening element and the machine element. As a result of the sealing bead and the arrangement thereof in the screw connection, said screw connection overall does not have any uncleanable dead zones because the fastening element and/or the washer do not have or do not delimit any corners/projections/gaps, under which impurities could accumulate, which then result in contamination. The screw connection is simple to clean, has smooth surfaces and therefore satisfies the CIP requirement for hygienic cleaning, particularly in the food or pharmaceutical industries.

The invention also relates to the use of a seal and of a screw connection, in each case as described previously, in product-conveying areas of the foodstuff or pharmaceutical industries and/or in production plants in the food or pharmaceutical sectors.

Specifically for this use, it is absolutely necessary for seals and/or screw connections to be cleaned as simply and as perfectly hygienically as possible, to reliably prevent germ formation and to thereby prevent any impairment of the foods or medicaments, which come into contact with the screw connection and/or are processed/produced in corresponding production plants.

In the following, an embodiment of the screw connection according to the invention with the seal according to the invention will be described in more detail with reference to FIGS. 1 to 3. Each of these figures is a schematic illustration of an embodiment.

Figure 2:
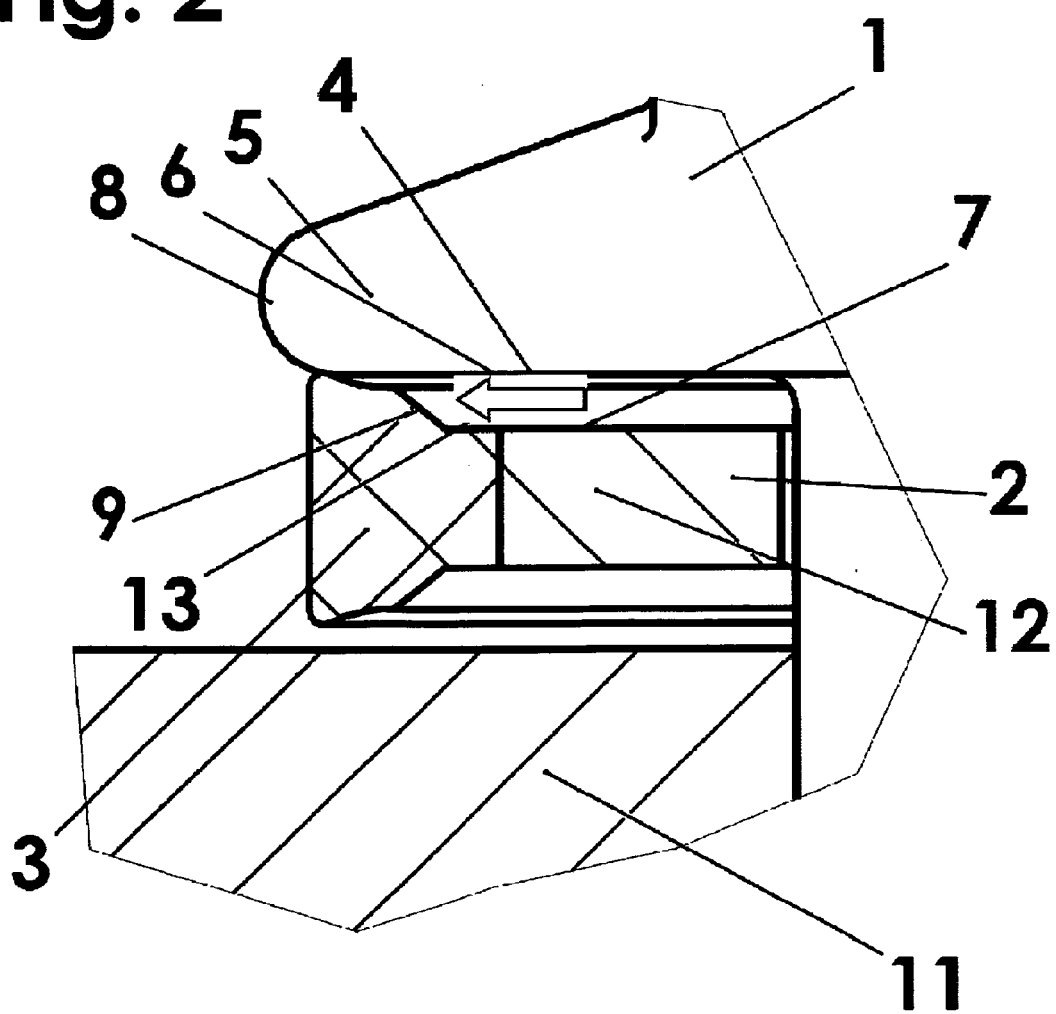
FIG. 2 shows a detail of the screw connection of FIG. 1 during assembly.

FIGS. 1 to 3 show an embodiment of a screw connection comprising a seal.

In this embodiment, the fastening element 1 is formed by a screw having a flange 5, according to DIN EN 1655. Furthermore, the seal comprises a washer 2 for the fastening element 1, which washer 2 is arranged in the axial direction between the flange 5 of the fastening element 1 and the machine element 11. The washer 2 comprises a centrally arranged flat metallic ring 12, the outer circumference of which is surrounded by the sealing bead 3 which consists of a flexible rubber sealing material, for example NBR or FKM.

The fastening element 1 has the flange 5 with its underside 6 on the side axially facing the washer 2, the fastening element 1 and the flange 5 being formed from the same material and being configured to merge integrally into one another. The underside 6 of the flange 5 and the top side 7 of the washer 2 rest on one another in a sealing manner during the correct use of the seal, as shown in FIG. 3.

It is crucial that the underside 6 of the flange 5 and the top side 7 of the washer 2 are substantially congruent because this means that uncleanable dead zones of the screw connection, for example between the screw head and the machine element 11, are avoided. Since the screw connection and the seal can be cleaned easily and effectively, any contamination is effectively prevented in this region so that the seal and the screw connection can be used in product-conveying areas of the food or pharmaceutical industries and/or in production plants in the food or pharmaceutical sectors. All the usual hygiene regulations are met. Hygiene regulations are for example regulations set by the EHEDG (European Hygienic Engineering & Design Group) and/or the provisions set by the American FDA (Food and Drug Administration).

FIG. 1 shows the screw connection not yet installed. The fastening element 1 has not yet been finally screwed into the hole 10 in the machine element 11 and thus the washer 2 has not yet been arranged in a sealing manner, with resilient pre-tension, between the underside 6 of the flange 5 of the fastening element 1 and the machine element 11 in the axial direction.

On its side axially facing the underside 6 of the flange 5, the sealing bead 3 has a surface 9 configured in two stages and widened radially outwards in the shape of a funnel, so that during the assembly of the seal, the washer 2 is centred automatically relative to the underside 6 of the flange 5.

FIG. 2 shows a detail of the seal from FIG. 1.

As previously described, the sealing bead 3 has a self-centering surface 9. During the assembly of the seal, the fastening element 1 is mounted in the hole 10 in the machine element 11, the washer 2 being arranged between the underside 6 of the flange 5 and the machine element 11. While the fastening element 1 is being mounted in the hole 10 in the machine element 11, the axial distance between the underside 6 of the flange 5 and the surface of the machine element 11 is continually reduced until the sealing bead 3 loosely rests on both the underside 6 of the flange 5 and the surface of the machine element 11. When the fastening element 1 is then screwed further into the hole 10 in the machine element 11, the washer 2 is automatically centred, by the two-stage funnel-shaped sealing bead 3, with respect to the underside 6 of the flange 5. This self-centering effect is illustrated by arrow 13 in FIG. 2.

FIG. 3 shows the screw connection and the seal during the correct use thereof. Starting from the state shown in FIG. 1, first the state shown in FIG. 2 and then the state in FIG. 3 is reached, where the fastening element has been fully screwed into the hole 10 in the machine element 11, the flat ring 12 of the washer 2 serving as a force limiter for the sealing bead 3. The underside 6 of the flange 5 rests on an end face of the flat ring 12, the other end face of the flat ring 12 also resting on the surface of the machine element 11.

The sealing bead 3 which surrounds the outer circumference of the flat ring 12 is arranged, with axial pre-tension, between the underside 6 of the flange 5 and the surface of the machine element 11 and seals the screw connection, the outer radius of the flange 5 being reproduced by the sealing bead 3.

The surface 9 of the top side 7 of the washer 2 is formed, by the multi-stage contour thereof, congruently to the underside 6 of the flange 5 of the fastening element 1.

The congruent configuration of the washer 2 and of the fastening element 1 in the region of the mutual contact thereof produces the substantially smooth surface of the screw connection, free from sudden changes in direction, gaps and projections. A substantially smooth, easily cleanable surface of this type is a prerequisite for the germ-free maintenance of the seal and the screw connection even during a long service life. Therefore, a screw connection and a seal of this type can be used in the food or pharmaceutical sectors and comply with all the current hygiene regulations.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A seal of a fastening element, the seal comprising:
the fastening element; and
a washer for the fastening element,
wherein the fastening element and the washer are arranged coaxially and axially adjacent to one another,
wherein the washer includes a sealing bead including a flexible rubber sealing material on an outer circumference,
wherein the sealing bead is configured to contact a fastening element underside in a sealing manner during correct use of the seal,
wherein the fastening element includes a flange on a flange underside, the flange underside axially facing the washer,
wherein the washer includes a washer top side axially facing the flange,
wherein the flange underside and the washer top side rest on one another in a sealing manner during the correct use of the seal,
wherein the flange underside and the washer top side are substantially congruent, and
wherein the sealing bead rests on an outer circumferential boundary of the flange underside in a sealing manner, and
wherein the sealing bead has a substantially funnel-shaped surface on a sealing bead top side, the sealing bead top side axially facing the flange underside.

2. The seal of claim 1, wherein the fastening element is configured as a screw or as a nut.

3. The seal of claim 2, wherein the fastening element is configured as the nut and the nut is configured as a cap nut.

4. The seal of claim 1, wherein the fastening element and the flange are configured to merge integrally into one another.

5. The seal of claim 1, wherein a surface of the sealing bead top side is configured to be self-centering.

6. A screw connection, comprising:
the seal of claim 1,
wherein the fastening element is arranged in a hole in a machine element,
wherein the sealing bead is arranged, with resilient axial pre-tension, in a sealing manner between the flange underside of the fastening element and the machine element.

7. The seal of claim 1, wherein the substantially funnel-shaped surface is widened radially outwards at least in two stages.

* * * * *